(12) United States Patent
Feick et al.

(10) Patent No.: US 7,766,646 B2
(45) Date of Patent: Aug. 3, 2010

(54) INJECTION MOLDING APPARATUS WITH PLATE ACTUATION OF VALVE PINS

(75) Inventors: Murray Feick, Kitchener (CA); Stefan Engleder, Schwertberg (AT); Douglas Ursu, Orangeville (CA)

(73) Assignee: Mold-Masters (2007) Limited, Georgetown (CA)

( * ) Notice: Subject to any disclaimer, the term of this patent is extended or adjusted under 35 U.S.C. 154(b) by 217 days.

(21) Appl. No.: 12/140,527

(22) Filed: Jun. 17, 2008

(65) Prior Publication Data

US 2009/0148551 A1    Jun. 11, 2009

Related U.S. Application Data

(60) Provisional application No. 60/945,881, filed on Jun. 22, 2007.

(51) Int. Cl.
*B29C 45/22* (2006.01)

(52) U.S. Cl. .................................. 425/564; 425/566

(58) Field of Classification Search ............... 425/562, 425/563, 564, 565, 566
See application file for complete search history.

(56) References Cited

U.S. PATENT DOCUMENTS

| | | | |
|---|---|---|---|
| 2,828,507 A | 4/1958 | Strauss | |
| 2,865,050 A | 12/1958 | Strauss | |
| 2,878,515 A | 3/1959 | Strauss | |
| 4,436,496 A | 3/1984 | Laghi | |
| 5,067,893 A * | 11/1991 | Osuna-Diaz | ............... 425/564 |
| 5,078,589 A | 1/1992 | Osuna-Diaz | |
| 6,113,381 A | 9/2000 | Gellert et al. | |
| 6,183,239 B1 | 2/2001 | Belous | |
| 6,755,641 B1 | 6/2004 | Nakanishi | |
| 7,210,922 B1 | 5/2007 | Kohler | |

FOREIGN PATENT DOCUMENTS

| | | |
|---|---|---|
| DE | 40 34 934 C2 | 5/1992 |
| DE | 199 43 797 A1 | 3/2001 |
| DE | 199 56 215 C2 | 6/2001 |
| JP | 7-125015 A | 5/1995 |

(Continued)

*Primary Examiner*—Tim Heitbrink
(74) *Attorney, Agent, or Firm*—Medler Ferro PLLC

(57) ABSTRACT

An injection molding apparatus includes a back plate, a driven pulley connected to the back plate and rotatable with respect to the back plate, a screw connected to the driven pulley to rotate with the driven pulley, a motor having an attached drive pulley, a belt or chain coupling the driven pulley and the drive pulley, a valve pin plate, a nut connected to the valve pin plate and mated with the screw, at least one valve pin connected to the valve pin plate, a manifold fixed with respect to the back plate, and at least one nozzle connected to the manifold. The valve pin extends through the nozzle to control flow of molding material. The screw can be a ball screw and nut can be a ball nut. The screw can have one portion connected to the driven pulley and another portion connected to a mold plate in a rotatable manner. The valve pin plate may be an assembly with an upper plate, a lower plate, and at least one valve pin holder fixed between the upper plate and the lower plate, the valve pin being fastened to the valve pin plate assembly with the valve pin holder. The positions of the screw and nut can be reversed.

19 Claims, 11 Drawing Sheets

FOREIGN PATENT DOCUMENTS

| | | |
|---|---|---|
| JP | 11-254487 A | 9/1999 |
| JP | 2001-105458 A | 4/2001 |
| JP | 2002-096359 A | 4/2002 |
| KR | 10-0655750 B1 | 12/2006 |
| KR | 2007-0041115 A | 4/2007 |
| WO | WO-2006-080807 A1 | 8/2006 |

\* cited by examiner

INJECTION MOLDING APPARATUS WITH PLATE ACTUATION OF VALVE PINS

CROSS-REFERENCE TO RELATED APPLICATION

This application claims the benefit of U.S. provisional patent application No. 60/945,881 filed Jun. 22, 2007, which is hereby incorporated by reference in its entirety herein.

BACKGROUND OF THE INVENTION

1. Field of the Invention

The present invention relates to injection molding. More particularly, the present invention relates to valve pin actuation in a hot runner.

2. Related Art

Valve pins of injection molding apparatuses, and specifically of hot halves and hot runners, are sometimes actuated in unison by a plate. The accurate and reliable movement of such plate is critical to the effective operation of the valve pins.

SUMMARY OF THE INVENTION

Generally, according to the present invention, an injection molding apparatus includes a back plate, a driven pulley connected to the back plate and rotatable with respect to the back plate, a screw connected to the driven pulley to rotate with the driven pulley, a motor having an attached drive pulley, a belt coupling the driven pulley and the drive pulley, a valve pin plate, a nut connected to the valve pin plate and mated with the screw, at least one valve pin connected to the valve pin plate, a manifold fixed with respect to the back plate, and at least one nozzle connected to the manifold, the valve pin extending through the nozzle to control flow of molding material.

According to one aspect of the present invention, the screw is a ball screw and the nut is a ball nut.

According to another aspect of the present invention, the screw has one portion connected to the driven pulley and another portion connected to a mold plate in a rotatable manner.

According to another aspect of the present invention, the valve pin plate is part of an assembly that has an upper plate, a lower plate, and at least one valve pin holder fixed between the upper plate and the lower plate. The valve pin is fastened to the valve pin plate assembly with the valve pin holder.

According to another aspect of the present invention, the positions of the screw and nut are reversed.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
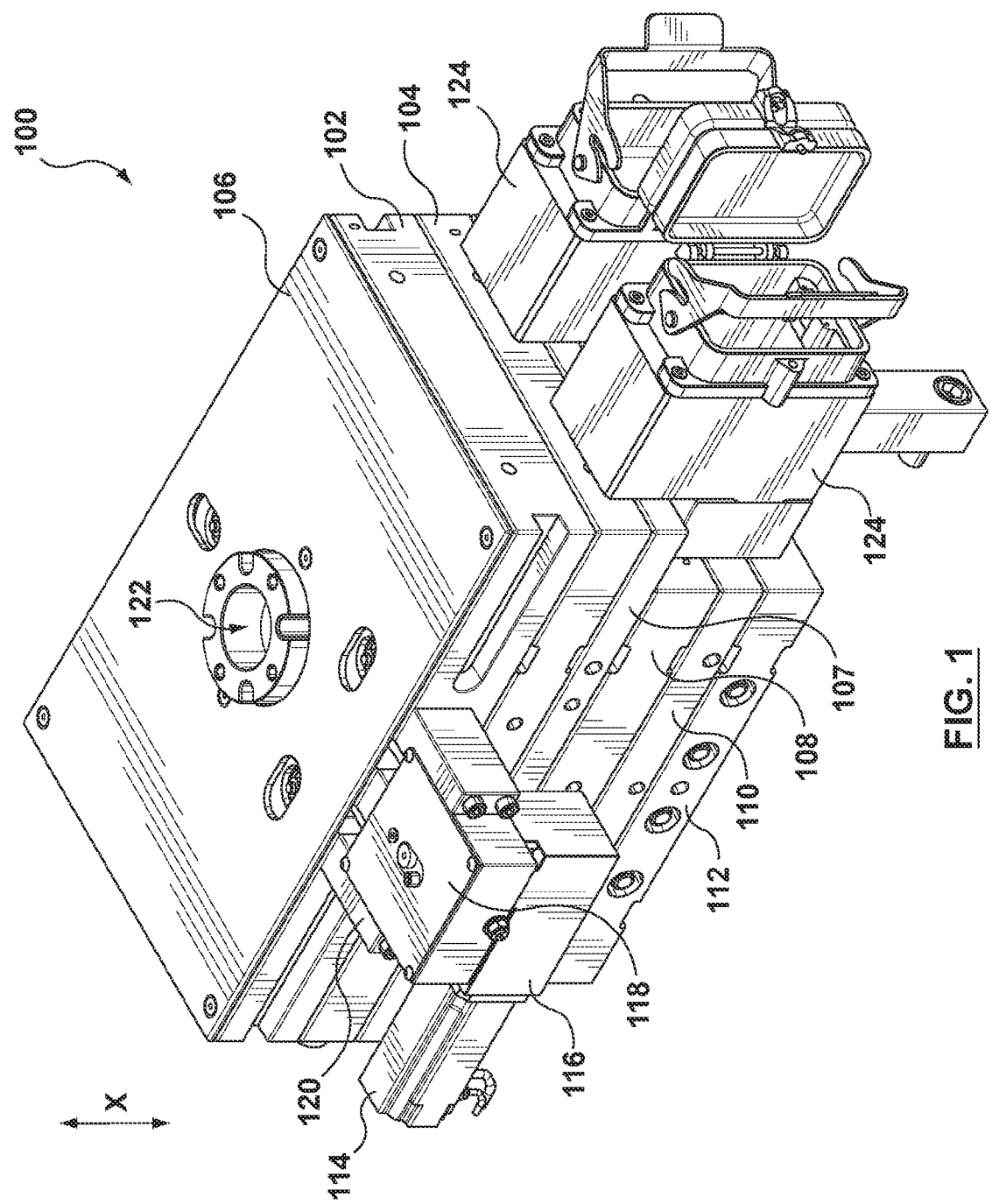
FIG. 1 is a perspective view of an injection molding apparatus according to an embodiment of the present invention.

FIG. 1 is a perspective view of an injection molding apparatus 100 according to an embodiment of the present invention. The injection molding apparatus 100 may also be referred to as a hot half.

The injection molding apparatus 100 includes a back plate 102, an intermediate plate 104, a cover plate 106, a first mold plate 107, a second mold plate 108, a third mold plate 110, a fourth mold plate 112, a motor 114, a gearbox 116, a pulley housing 118, supports 120, an inlet 122 for receiving molding material (e.g., plastic melt), and electrical housings 124.

The back plate 102, the intermediate plate 104, the cover plate 106, and the mold plates 108, 110, and 112 are stacked and are all made of steel and form the overall structure of the injection molding apparatus 100. When in service, the cover plate 106 faces a plasticizing screw of an injection molding machine and the remaining plates 102, 104, 107, 108, 110, and 112 can be connected to various other parts of the injection molding machine. The back plate 102 can be considered a main point of reference for this description. Unless otherwise stated, when movement or rotation is described, it is with respect to the back plate 102.

The motor 114 and gearbox 116 form a drive assembly that is connected to the back plate 102 by the supports 120 via the pulley housing 118. The motor 114 can be an electrical motor, as shown, and can be connected to a power supply (not shown) and a controller (not shown). The motor 114 can also have its own controller therein and/or an encoder or similar transducer therein to measure the rotational position and/or speed of the motor 114. The motor is connected to the gearbox 116 by bolts for ease of assembly. The gearbox 116 contains gears that transfer the rotational motion of the shaft of the motor to rotational motion about an axis X. The gearbox 116 can include a clutch, if desired. The pulley housing 118 is held to the back plate 102 by the supports 120.

In service, the inlet 122 is coupled to a sprue of an injection molding machine, from which molding material is delivered to the injection molding apparatus 100. The electrical housings 124 provide a place for electrical connectors or circuits for the injection molding apparatus 100, including connectors or circuits for the motor 114, if desired.

Figure 2:
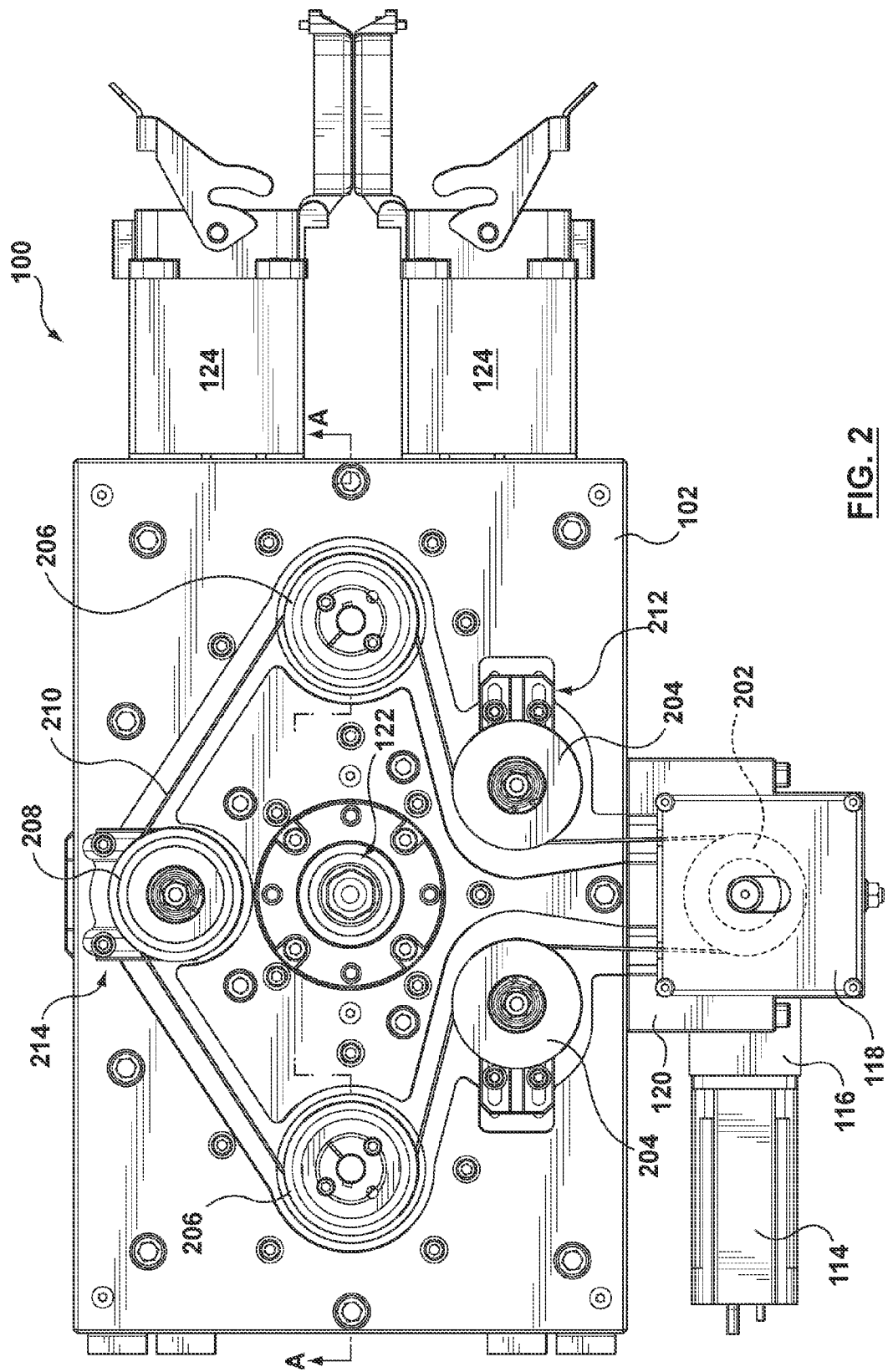
FIG. 2 is a top view of the injection molding apparatus of FIG. 1 with a cover plate removed.

As shown in FIG. 2, a top view in which the cover plate 106 and the cover of the pulley housing 118 are removed, the injection molding apparatus 100 further includes a drive pulley 202, idlers 204, driven pulleys 206, a tension pulley 208, and a belt 210. Also shown are various bolts and other fasteners that hold the injection molding apparatus 100 together.

The drive pulley 202 is connected to and driven by the motor 114 via the gearbox 116. This can be accomplished by, for example, the drive pulley 202 being fixed to an output shaft extending out from the gearbox 116. The position of the drive pulley 202 can be made to be adjustable, if desired.

The idlers 204 are connected to the back plate 102. The idlers 204 serve to guide the belt 210 towards the driven pulleys 206. In this embodiment, the position of each idler 204 can be made adjustable by way of the shaft of the idler 204 being connected to a plate having slotted holes and bolted to the back plate 102, as indicated at 212, but this is optional. In other embodiments, one or both of the idlers 204 can be omitted or can be replaced by one or more tension pulleys, according to specific geometry or requirements.

The driven pulleys 206 are connected to the back plate 102. The driven pulleys 206 are connected to screws, as will be discussed later. In this embodiment, two driven pulleys 206 are used, but more or fewer are acceptable.

The tension pulley 208 is connected to the back plate 102. The tension pulley 208 provides tension adjustment to the belt 210 and further serves to keep the belt 210 from obstructing the inlet 122. In this embodiment, the shaft of the tension pulley 208 is connected to a plate having slotted holes and bolted to the back plate 102, as indicated at 214. This allows the position of the tension pulley 208 to be adjusted to provide the belt 210 with suitable tension. In another embodiment, the tension pulley 208 can be spring-loaded to achieve this. In still another embodiment, the tension pulley 208 is omitted.

The belt 210 is wrapped around the drive pulley 202, the idlers 204, the driven pulleys 206, and the tension pulley 208. The belt transmits rotational power from the drive pulley 202 to the driven pulleys 206. The belt 210 can be made from any suitable material, such as KEVLAR by DUPONT. In other embodiments, the belt 210 can be replaced by a similar component, such as a chain. Similarly, when using a chain, the pulleys would include teeth, which may be commonly referred to as a sprocket. When the term pulley and belt are used in this application, a chain and sprocket may also be used. Further, a rope or other similar device to a belt may be used.

In this embodiment, the drive pulley 202, the driven pulleys 206, and the tension pulley 208 are toothed as is the inside of the belt 210. The idlers 204 are not toothed, as they contact the outside of the belt 210. The tension pulley 208 can be adjusted to ensure that the teeth of the belt 210 and the teeth of the driven pulleys 206 line up and mesh adequately. In other embodiments, a toothless belt and toothless pulleys can be used.

Figure 3A:
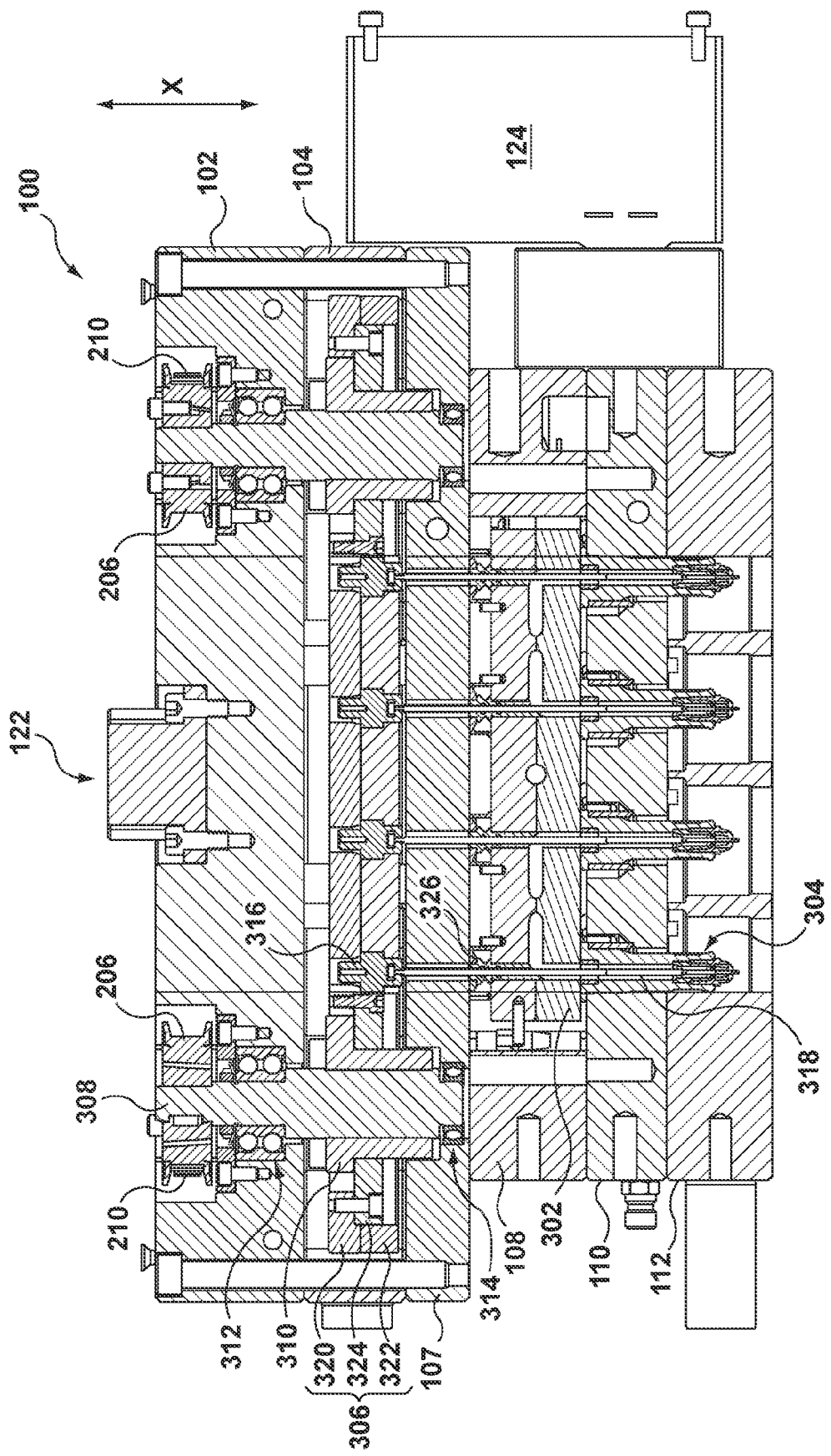
FIG. 3a is a section view along line section line A-A of FIG. 2, showing the valve pins in the closed position.

FIG. 3a shows a section view along line section line A-A of FIG. 2. As can be seen, the injection molding apparatus 100 further includes a manifold 302, nozzles 304, a valve pin plate assembly 306 including valve pin holders 316, ball screws 308, ball nuts 310, bearings 312 and 314, and valve pins 318.

The manifold 302 is located among the mold plates 107, 108, 110, and is offset from these plates by an insulating air space. The manifold 302 has a manifold melt channel connected to the inlet 122 by way of an inlet melt channel of an inlet pipe (not shown) for conveying molding material. The manifold 302 can include a heater, such as a resistive wire heater.

The nozzles 304 are connected to the manifold 302 and have nozzle melt channels for delivering molding material from the manifold 302 to a mold cavity or cavities (not shown). In this embodiment, sixteen nozzles 304 are used (but only four visible), but more or fewer are acceptable. The nozzles 304 are held in wells of mold plates 110 and 112 by way of shoulders or flanges near the heads of the nozzles 304 and corresponding shoulders of the mold plate 110. Each nozzle 304 can include well known components such as a nozzle body, nozzle head, nozzle tip, tip retainer, heater, thermocouple, and terminal end. The nozzles 304 together with the manifold 302 may be referred to as a hot runner.

The valve pin plate assembly 306 is located in a space between the back plate 102, the intermediate plate 104, and the first mold plate 107, such space being large enough to allow movement of the valve pin plate assembly 306 along the axis X. The valve pin plate assembly 306 includes a top plate 320, a bottom plate 322, and bolting flanges 324. The top plate 320 and bottom plate 322 hold the valve pin holders 316, which in turn hold the valve pins 318. Therefore, when the valve pin plate assembly 306 moves, the valve pins 318 move. The bolting flanges 324 connect the ball nuts 310 to the top plate 320. In other embodiments, a single plate can be used instead of the valve pin plate assembly 306.

Each ball screw 308 is fixed to a driven pulley 206 at one end and rotates with the driven pulley 206. Each ball screw 308 is coupled to bearings 312, 314 near its ends to facilitate rotation. Each ball screw 308 has an outside helical groove between the bearings 312, 314 for receiving the balls (see FIG. 9). One ball screw 308 should be used for each driven pulley 206. In other embodiments, other kinds of screws can be used.

The ball nuts 310 are fixed to the bolting flanges 324. Each ball nut 310 has an inside helical groove for receiving the balls (see FIG. 9). Via the balls, the each ball nut 310 mates with one of the ball screws 308. In other embodiments, other kinds of nuts can be used to correspond with the kind of screw used.

The ball screws 308 in combination with the ball nuts 310 offer the advantage of increased efficiency over, e.g., simple threaded rods and nuts. Some ball screw and ball nut combinations can offer up to 95% efficiency in converting rotation to translation, minimizing the motor 114 size required. In the present embodiment, each valve pin 318 may have to close against a force as high as 800 N (180 lbf), for example. This means that each of the two ball screw 308 and ball nut 310 combinations would have to provide 6,400 N of force (1,440 lbf), a force not manageable by simple screws and nuts of practical size. Another advantage of ball screws and ball nuts is that they are as not susceptible to seizing or galling as simple screws and nuts are. In other embodiments, however, other kinds of screws and nuts can be used, including simple screws and nuts, provided that they can take the required load.

Each set of bearings 312 connects a ball screw 308 to the back plate 102, so that the ball screw 308 can rotate smoothly with respect to the back plate 102. The bearings 312 in the present embodiment are ball bearing assemblies, though other kinds of bearings can be used instead.

Similarly, each set of bearings 314 connects a ball screw 308 to the first mold plate 107, so that the ball screw 308 can rotate smoothly with respect to the mold plate 107. The bearings 314 in the present embodiment are ball bearing assemblies, though other kinds of bearings can be used instead.

Each valve pin holder 316 holds a valve pin 318 to the valve pin plate assembly 306. In this embodiment, each valve pin holder 316 firmly holds the valve pin 318 against movement with respect to the valve pin plate assembly 306 along the axis X. The valve pin holders 316 can be disengaged from the valve pins 318, are separable from the valve pin plate assembly 306, and will be described in more detail later.

Each valve pin 318 extends through the first mold plate 107, the manifold 302, a valve pin bushing 326, and a nozzle 304. The valve pins 318 are moved in unison by way of the movable valve pin plate assembly 306 to control the flow of molding material from the nozzles 304 to the mold cavity or cavities. In this embodiment, when the valve pins 318 are moved along the axis X away from the back plate 102, the valve pins 318 close mold gates (not shown) to stop the flow of molding material; and when the valve pins 318 are moved along the axis X towards the back plate 102, the valve pins 318 open the mold gates to permit the flow of molding material.

In FIG. 3a, other components are illustrated but not described, since they are well known. These include bolts, pins, bushings, seals, openings, etc. Still other components are not illustrated for clarity or because they are not used in the specific embodiment shown (but can apply to other embodiments). These include mold gate inserts, various auxiliary plates, wires, conduits, etc.

Figure 3B:
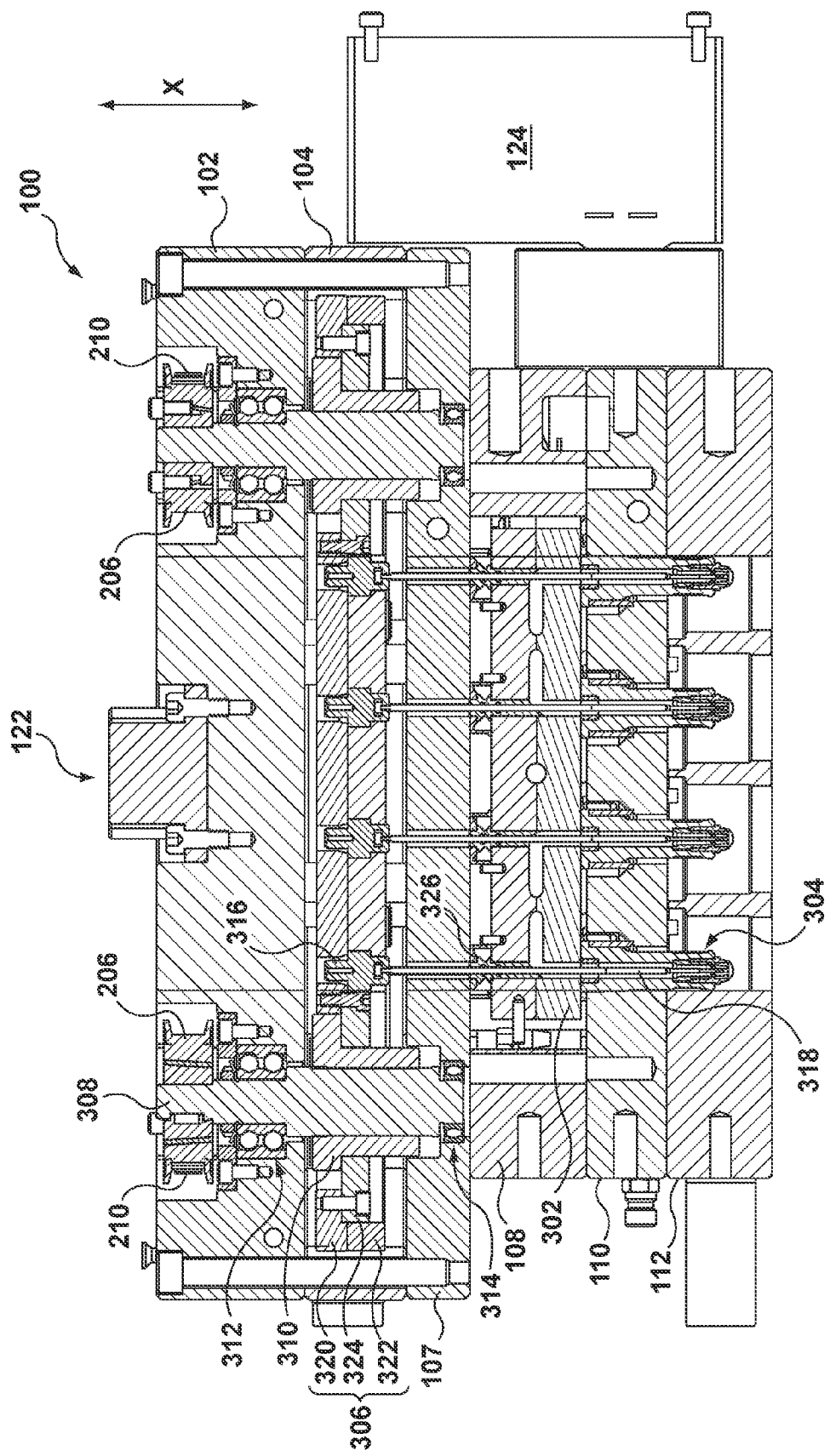
FIG. 3b is a section view along line section line A-A of FIG. 2, showing the valve pins in the open position.

Operation of the injection molding apparatus will now be discussed with reference to FIGS. 2, 3a, and 3b. The motor 114 is controlled to rotate in a first direction and accordingly transmits rotational power to the drive pulley 202 via the gearbox 116. The drive pulley 202 drives the belt 210, which spins the driven pulleys 206. The ball screws 308 rotate with the driven pulleys 206 and cause the ball nuts 310 to translate along axis X. The valve pin plate assembly 306, moving with the ball nuts 310, moves the valve pins 318 along the axis X away from the back plate 102 to close the mold gates in unison, as shown in FIG. 3a. When the motor 114 is controlled to rotate in a second direction, opposite the first direction, the above mentioned components act in the opposite manner, resulting in the valve pin plate assembly 306 moving the valve pins 318 along the axis X towards the back plate 102 to open the mold gates in unison, as shown in FIG. 3b. In this way, the flow of molding material can be controlled.

Figure 8:
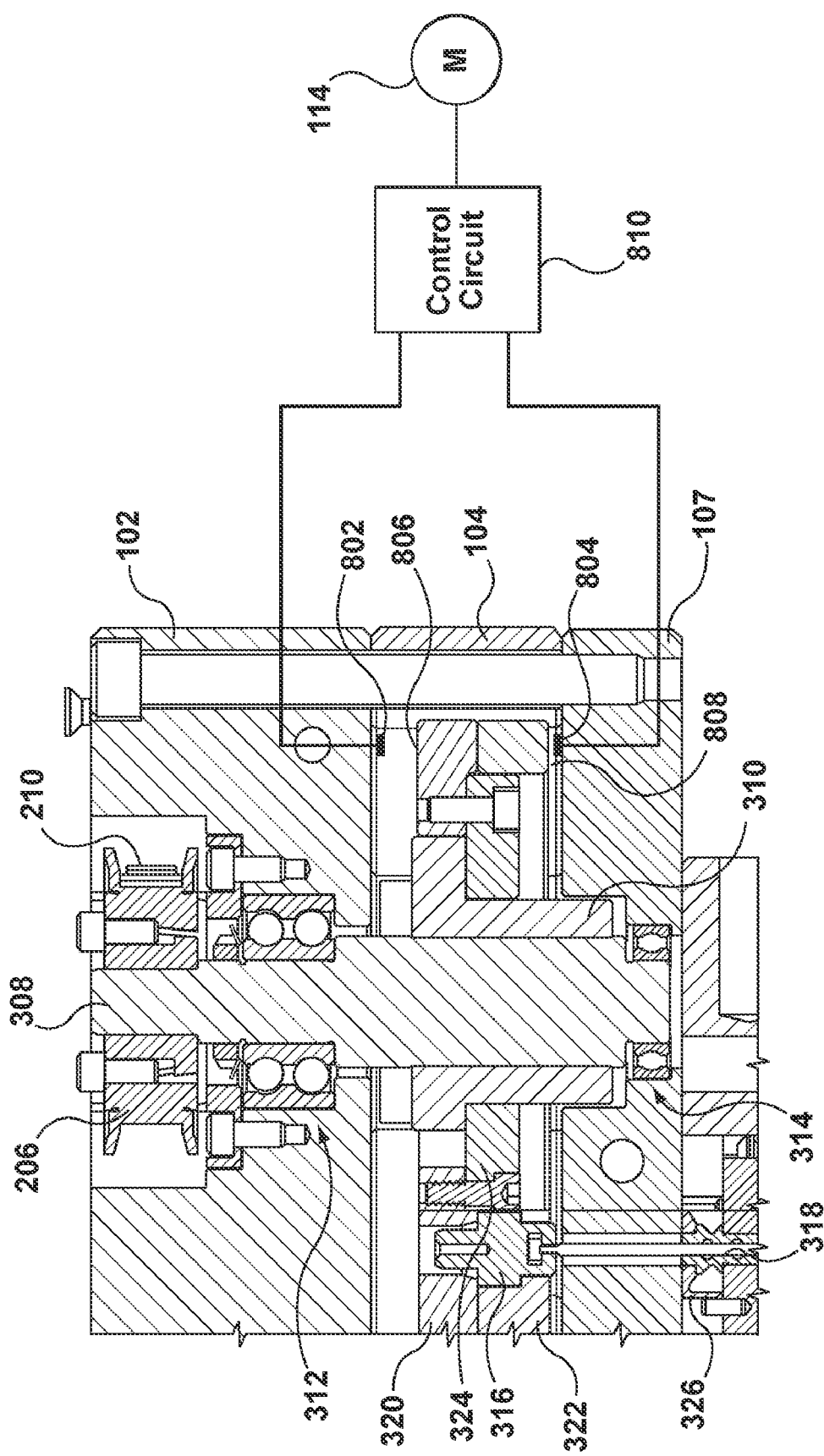
FIG. 8 is a section view of a portion of the injection molding apparatus of FIG. 3, showing limit switches.

The time at which the motor 114 must reverse can be determined by an encoder in the motor or by limit switches provided to the valve pin plate assembly 306 or one or more of the other moving parts and/or stationary parts near such moving parts (see FIG. 8). The speed of the motor 114 can be controlled to obtain any cycle time required. In addition, the motor 114 need not provide constant rotation, but can drive the valve pins 318 in any mode desired.

Figure 4:
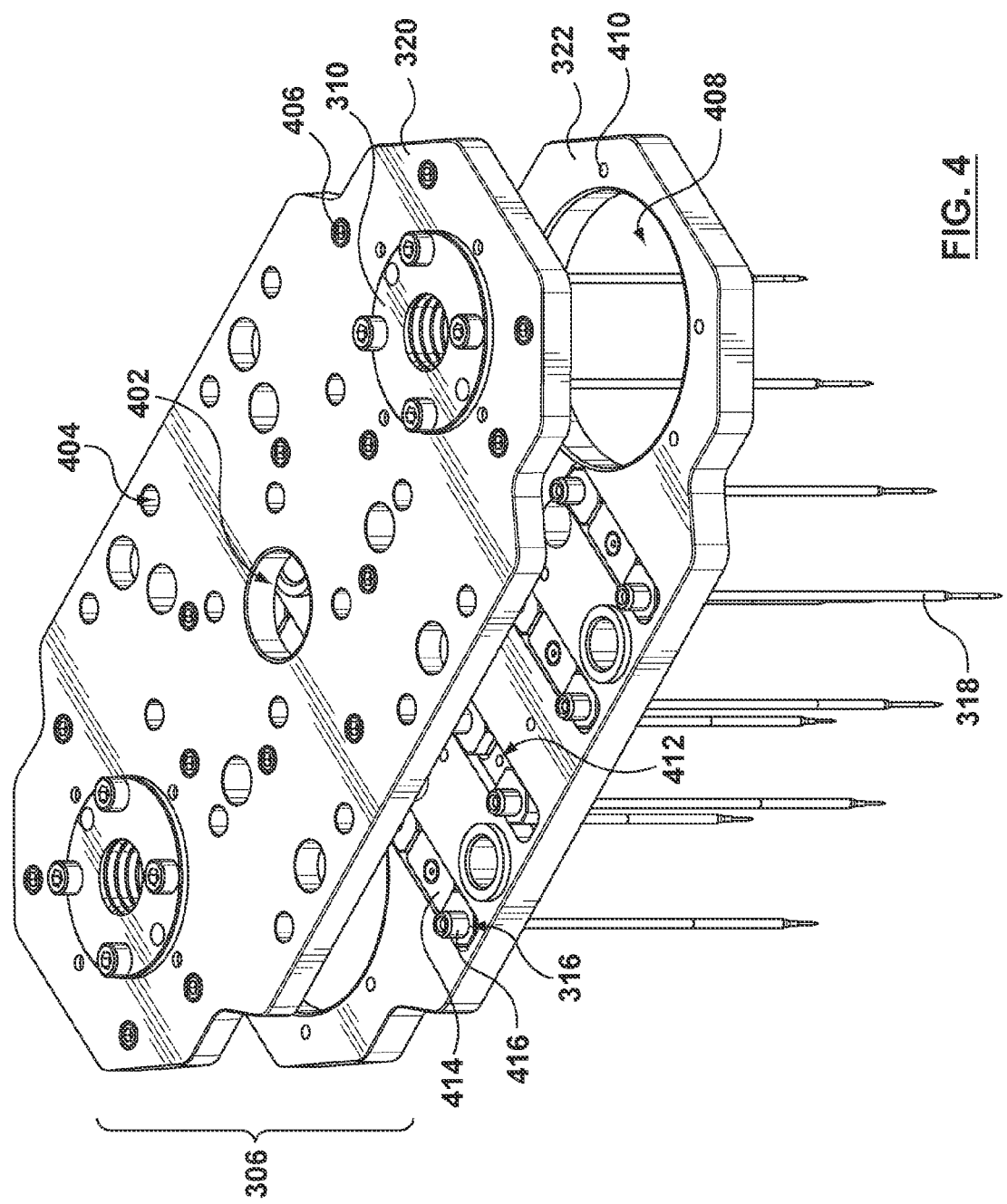
FIG. 4 is a top perspective view of the valve pin plate assembly of FIG. 3 when partially disassembled.

FIG. 4 shows a top perspective view of the valve pin plate assembly 306 when partially disassembled.

As can be seen, the top plate 320 includes a central opening 402 to accommodate the inlet pipe, a plurality of locking bores 404 to lock the positions of the valve pin holders 316, and a plurality of bolts 406 to connect the top plate 320 with the bottom plate 322.

The bottom plate 322 includes a central opening (ref. 502 of FIG. 5) to accommodate the inlet pipe, two openings 408 to accommodate the bolting flanges 324 and ball nuts 310, and a plurality of bolt holes 410 corresponding to the plurality of bolts 406 of the top plate 320. The bottom plate 322 further includes recesses 412 for accommodating the valve pin holders 316.

The valve pin holders 316 are situated in the recesses 412 of the bottom plate 322 and are slidable within these recesses 412 between two positions: one to hold the valve pin 318 and another to release the valve pin 318, as will be discussed shortly. Stops 414 are also provided in the recesses 412 to keep the valve pin holders 316 engaged with the heads of the valve pins 318. The stops 414 are removable and can be bolted to the bottom plate 322. Also, shown are necks 416 of the valve pin holders 316 that engage with the locking bores 404 of the top plate 320. The locking bores 404 fit the necks 416 of the valve pin holders 316 to keep the valve pin holders 316 engaged with the heads of the valve pins 318. The stops 414 are optional if the necks 416 and locking bores 404 are provided, and likewise, the necks 416 and locking bores 404 are optional if the stops 414 are provided. In another embodiment, a valve pin holder 316 is kept engaged with the head of a valve pin 318 by way of a bolt or screw that directly holds the valve pin holder 316 to the bottom plate 322.

Various other openings and alignment surfaces can be provided to the top plate 320 and the bottom plate 322. Some of these are shown and others are omitted for clarity.

Figure 5:
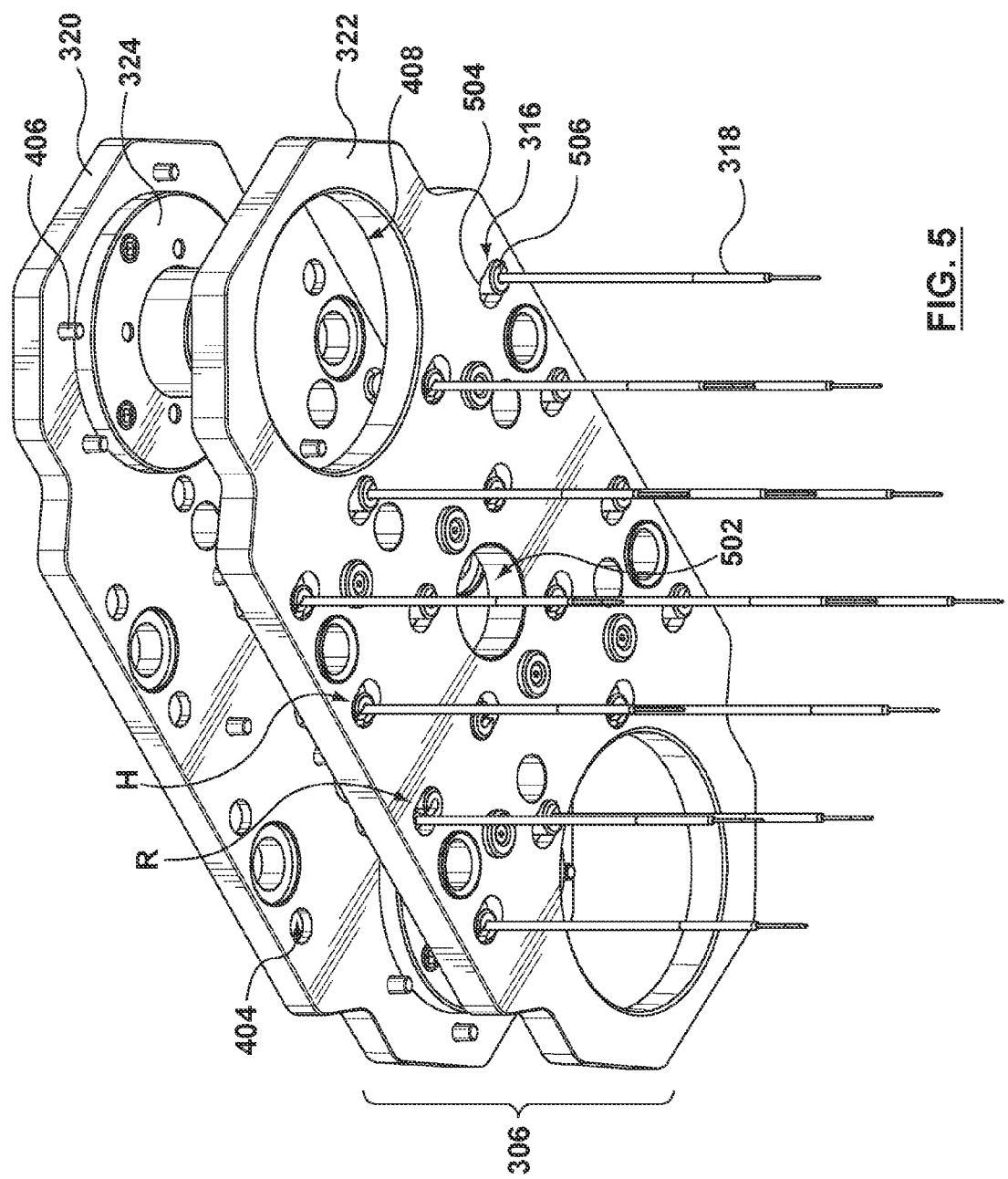
FIG. 5 is a bottom perspective view of the valve pin plate assembly of FIG. 3 when partially disassembled.

FIG. 5 shows a bottom perspective view of the valve pin plate assembly 306 when partially disassembled. Shown in this view is the central opening 502 of the bottom plate 322 to accommodate the inlet pipe. Also shown are slots 504 extending from the recesses 412 through the bottom plate 322. One slot 504 is provided for each valve pin 318. The slots 504 allow clip portions 506 of the valve pin holders 316 to extend therethrough and are large enough to allow movement of the valve pin holders 316 between the two hold/release positions.

Regarding these two positions, a valve pin holder 316 holding a valve pin 318 is shown at H, and a valve pin holder 316 releasing a valve pin 318 is shown at R.

Figure 6B:
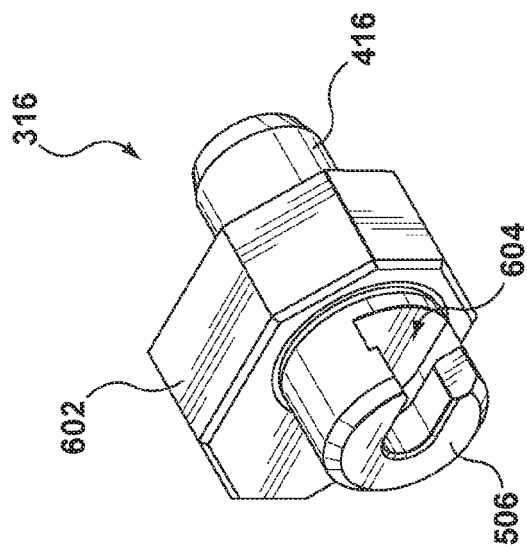
FIGS. 6a-b are perspective views of a valve pin holder according to an embodiment of the present invention.
Figure 6A:
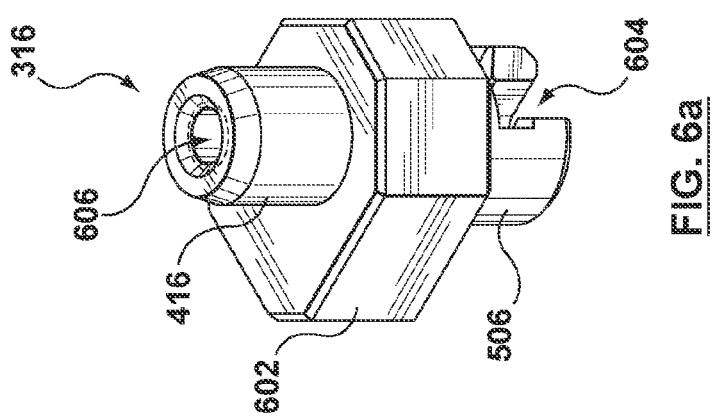

FIGS. 6a-b show in perspective the valve pin holder 316 according to an embodiment of the present invention. The valve pin holder 316 has a neck 416 and a clip portion 506 as discussed above, which extend from a generally larger main body 602. A "T" slot 604 is provided in the clip portion 506 to receive and hold the head of a valve pin 318. A threaded bore 606 is provided in the neck 416 to allow insertion of a tool in case the valve pin 318 becomes seized or locked in solidified molding material. Such tool can be used to forcibly slide the valve pin holder 316 to release the valve pin 318 or even to pull the valve pin holder 316 from the recess 412 hard enough to snap the valve pin 318, and thus free the bottom plate 322 from the valve pin 318.

Figure 7:
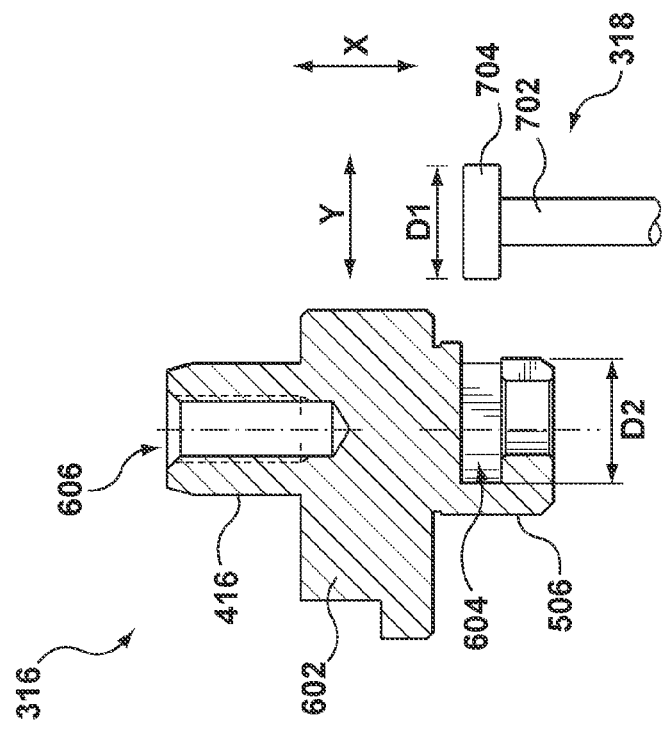
FIG. 7 is a section view of the valve pin holder of FIG. 6.

FIG. 7 is a section view of the valve pin holder 316, also showing a top portion of a valve pin 318. As can be seen, the valve pin 318 includes a stem 702 and a head 704. The stem 702 extends towards the mold gate. The head 704 can be held in the "T" slot 604 of the clip portion 506 of the valve pin holder 316. Axis Y indicates the directions in which the valve pin holder 316 is slid in order to hold and release the valve pin 318. The diameter or overall size, D1, of the head 704 can be made significantly smaller than the diameter or overall size, D2, of the wide portion of the "T" slot 604 to prevent the valve pin holder 316 from influencing the position of the valve pin 318 in any direction perpendicular to axis X (i.e., laterally). This can ensure that the lateral position of the valve pin 318 is maintained by the valve pin bushing 326 and/or the nozzle 304, as is typical in the art, and that the valve pin 318 will not become bent due to slight misalignment of the valve pin plate assembly 306 with respect to the normal stroke of the valve pins 318.

The valve pin plate assembly 306 including the valve pin holders 316 and related components provide a simple way to individually connect and disconnect the valve pins 318. One advantage of this is that, should a nozzle 304 have to be taken out of service (e.g., burnt out heater, damaged valve pin, etc.), the corresponding valve pin holder 316 can be disengaged from the valve pin 318 and removed to separate the valve pin plate assembly 306 from the valve pin 318. This allows continued operation of the injection molding apparatus 100 without having to immediately repair a nozzle 304 that can no longer be operated.

Regarding assembly and disassembly of the injection molding device, the following is a general procedure with reference to FIG. 3a. The back plate 102, driven pulleys 206, ball screws 308, bearings 312, ball nuts 310, bolting flanges 324, and top plate 320 are assembled into a first subassembly. The ball nuts 310 are located on the ball screws 308 as far from the back plate 102 as practical to allow access to the bolts 406 (see FIG. 4). Separately, the intermediate plate 104, mold plates 107, 108, 110, 112, bearings 314, manifold 302, nozzles 304, valve pin bushings 326, valve pins 318, valve pin holders 316, and bottom plate 322 are assembled into a second subassembly. Then, the first and second subassemblies are brought together, and the bolts 406 are tightened to connect the top plate 320 with the bottom plate 322 to complete the valve pin plate assembly 306. Finally, the ball screws 308 are turned to bring the valve pin plate assembly 306 near the back plate 102, and the back plate 102 is bolted to the intermediate plate 104 and the mold plate 107. Attachment of the remaining components can be done at any time to complete the assembly.

FIG. 8 shows a section view of a portion of the injection molding apparatus 100. Limit switches 802, 804 can be mounted on the back plate 102 and first mold plate 107, respectively. When a top surface 806 of the top plate 320 of the valve pin plate assembly 306 triggers the limit switch 802, a control circuit 810 can stop or reverse the direction of the motor 114. Likewise, when a bottom surface 808 of the bottom plate 322 of the valve pin plate assembly 306 triggers the limit switch 804, the control circuit 810 can stop or reverse the direction of the motor 114. As mentioned, the limit switches 802, 804 need not be provided if the motor 114 is connected to or includes an encoder or other transducer that serves the same purpose. Even if the motor 114 includes an encoder or other transducer, the limit switches 802, 804 can be included as a failsafe scheme.

Figure 9:
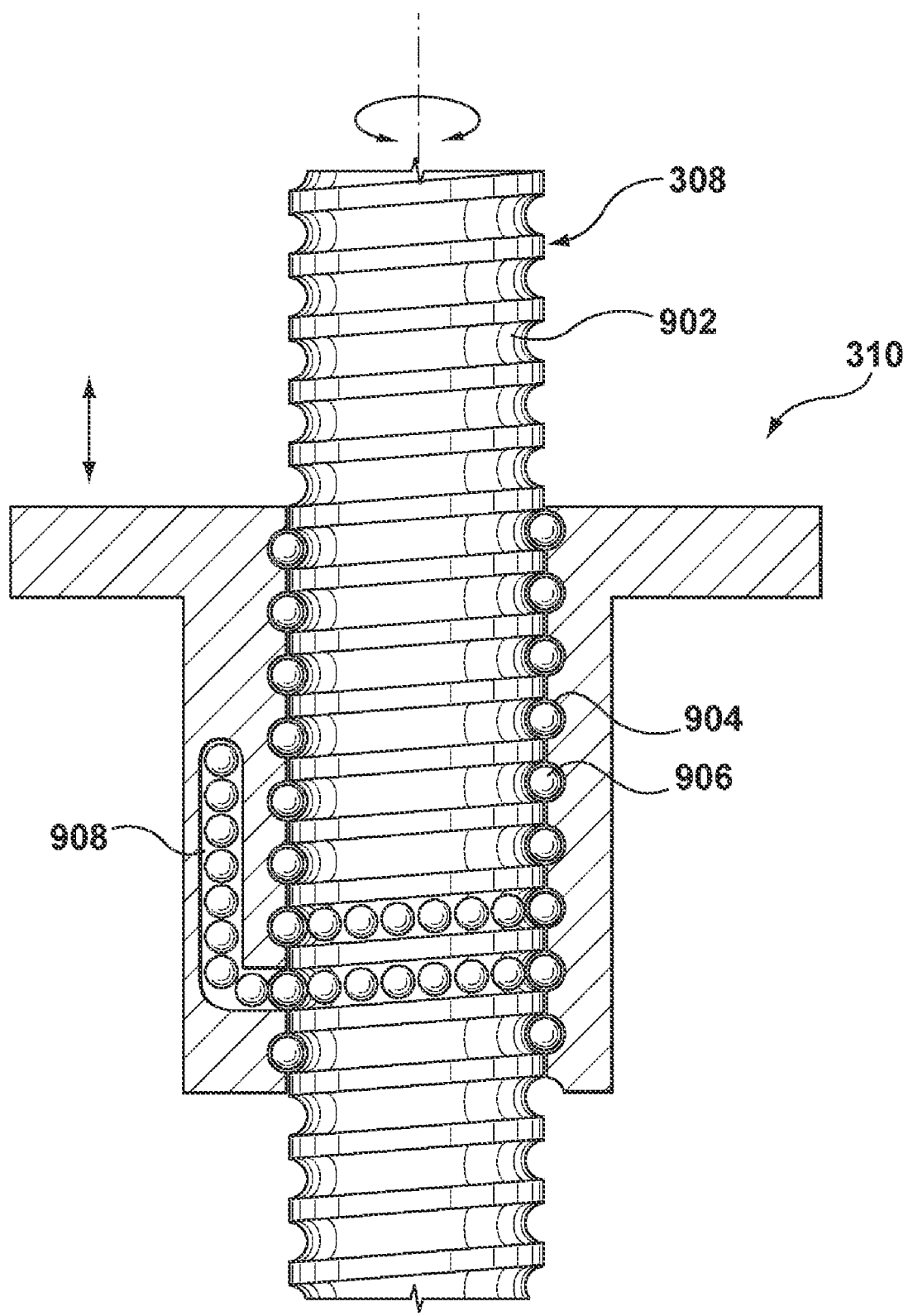
FIG. 9 is a section view of the ball screw and ball nut of FIG. 3.

FIG. 9 shows a section view of a ball screw 308 and a ball nut 310. The ball screw 308 includes a groove 902 and the ball nut 310 includes a corresponding groove 904 that both define a channel to receive a plurality of balls 906 (not all shown). The ball nut 310 further includes a ball return passageway 908 to feed the balls to the channel formed by the grooves 904, 906. When the ball screw 308 is rotated, the ball nut 310 translates along the length of the ball screw 308.

Figure 10:
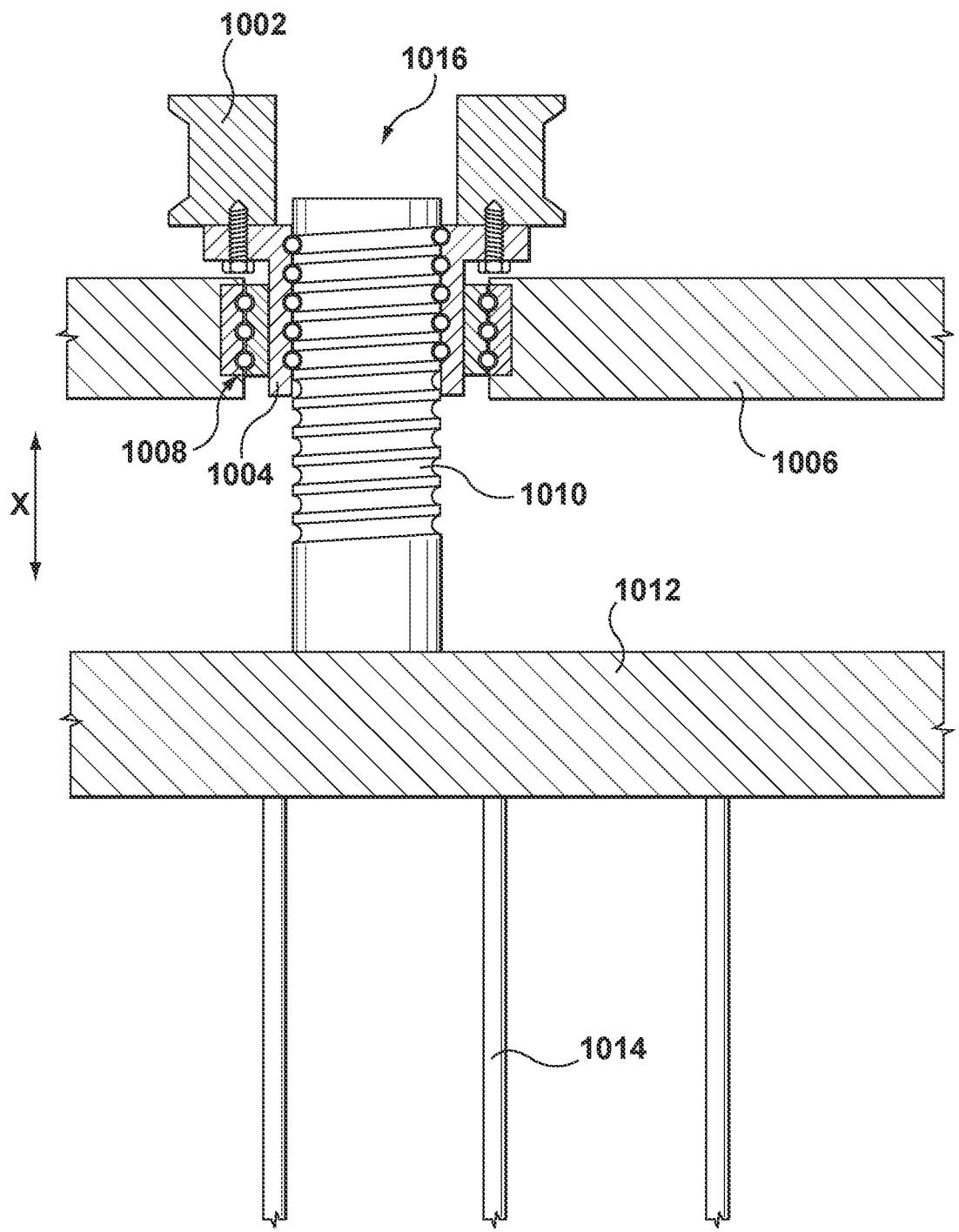
FIG. 10 is a schematic diagram of another embodiment, in which positions of a ball screw and ball nut are reversed.

FIG. 10 shows a schematic diagram of another embodiment, in which positions of a ball screw and ball nut are reversed. The features and aspects described for the other embodiments can be used accordingly with this embodiment.

A driven pulley 1002 is connected (e.g., by bolts) to a ball nut 1004, which is rotatable with respect to a back plate 1006 via bearings 1008. A ball screw 1010 is threaded to the ball nut 1004 and has an end fixed to a valve pin plate assembly 1012 that controls a plurality of valve pins 1014 to move in unison along the axis X. The driven pulley 1002 has a central opening 1016 large enough to accommodate the ball screw 1010 when the valve pin plate assembly 1012 is moved towards the back plate 1006. Operation is similar to that described with respect to FIGS. 3a and 3b.

Figure 11:
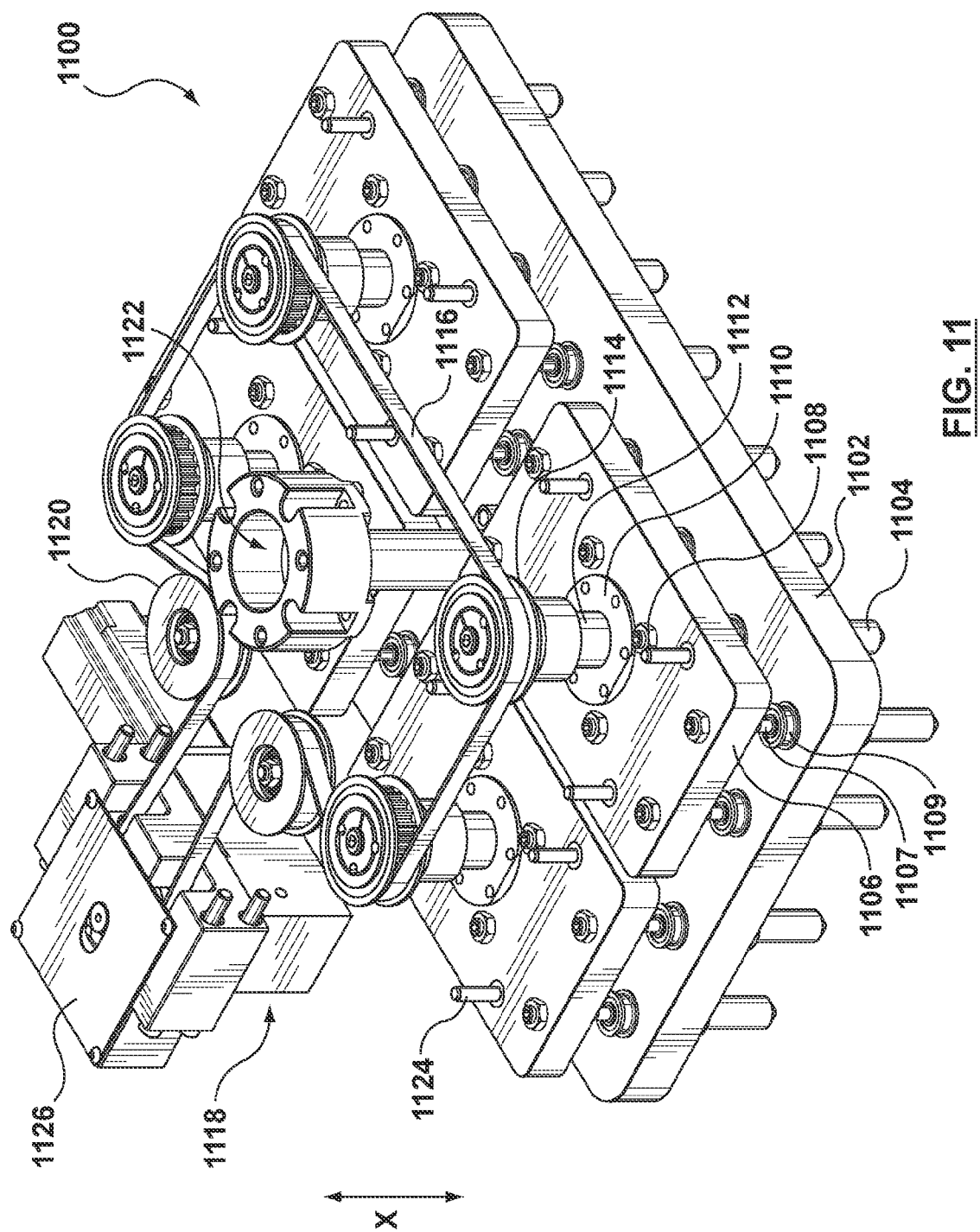
FIG. 11 is a perspective view of another embodiment of an injection molding apparatus with the cover plate removed.

FIG. 11 shows a perspective view a portion of an injection molding apparatus 110 according to another embodiment of the present invention. FIG. 11 does not show plates, such as the back plate and mold plates for clarity. Features from other embodiments may be included in this embodiment.

Injection molding apparatus 1100 includes a manifold 1102 and nozzles 1 104. A manifold channel (not shown) in manifold 1102 directs molding material received from an inlet 1122 to nozzle channels (not shown) in the nozzles 1104. The nozzle channels direct the molding material through mold gates to mold cavities. In the embodiment shown in FIG. 11, there are thirty-two nozzles. Each nozzle 1104 includes a valve pin 1107 extending through the nozzle channel, through the manifold 1102, through a valve pin bushing 1109, and coupled to a valve pin plate 1106 using a valve pin holder 1108.

In the embodiment shown in FIG. 11, injection molding apparatus 1100 includes four valve pin plates 1106, instead of the single valve pin plate assembly 306 shown in FIGS. 3a and 3b. Further, each valve pin plate 1106 is coupled to a driven pulley 1114 using a ball screw 1112 and ball nut 1110, as described with respect to the previous embodiments. Each valve pin plate 1106 of the present embodiment is a single plate, rather than the valve pin plate assembly 306 of the embodiment shown in FIGS. 3a and 3b, wherein the valve pin plate assembly 306 includes a top plate 320, a bottom plate 322, and bolting flanges 324.

In operation, the injection molding apparatus 1100 shown in FIG. 11 operates much like injection molding apparatus 100. In particular, a motor 1118 is controlled to rotate in a first direction and accordingly transmits rotational power to a drive pulley 202 (not shown, but located within a gearbox 1126 shown in FIG. 11). The drive pulley drives a belt 1116, which spins the driven pulleys 1114. The ball screws 1112 rotate with the driven pulleys 1114 and cause the ball nuts 1110 to translate along an axis X. The valve pin plates 1106, moving with the ball nuts 1110, move the valve pins 1107 along the axis X away from the back plate (not shown) to close the mold gates in unison. When the motor 1118 is controlled to rotate in a second direction, opposite the first direction, the above mentioned components act in the opposite manner, resulting in the valve pin plates 1106 moving the valve pins 1107 along the axis X towards the back plate to open the mold gates in unison. The motor 1118 can be controlled as explained with respect to the previous embodiment.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

What is claimed is:

1. An injection molding apparatus, comprising:
   a motor;
   a drive pulley coupled to the motor;
   a belt or chain coupled to the drive pulley;
   a driven pulley coupled to the belt or chain;
   a back plate, wherein the driven pulley is coupled to the back plate and rotatable with respect to the back plate;
   a ball screw coupled to the driven pulley to rotate with the driven pulley;
   a valve pin plate;
   a ball nut connected to the valve pin plate and mated with the ball screw;
   a valve pin connected to the valve pin plate;
   a manifold fixed with respect to the back plate; and
   a nozzle connected to the manifold, the valve pin extending through the nozzle to control flow of molding material.

2. The injection molding apparatus of claim 1, wherein the valve pin plate includes a top plate, a bottom plate, and a bolting flange, wherein the bolting flange connects the ball nut to the top plate.

3. The injection molding apparatus of claim 2, further comprising a valve pin holder connecting the valve pin to the valve pin plate, wherein the valve pin holder is disposed between the top plate and the bottom plate.

4. The injection molding apparatus of claim 3, wherein the valve pin holder includes a neck portion, a clip portion, and a main body portion disposed between the neck and clip portions, wherein a T-slot is provided in the clip portion to receive and hold a head of the valve pin.

5. The injection molding apparatus of claim 1, further comprising a valve pin holder connected to the valve pin plate, the valve pin holder connecting the valve pin to the valve pin plate.

6. The injection molding apparatus of claim 5, wherein the valve pin holder includes a neck portion, a clip portion, and a main body portion disposed between the neck and clip portions, wherein a T-slot is provided in the clip portion to receive and hold a head of the valve pin.

7. The injection molding apparatus of claim 1, wherein there are at least two driven pulleys coupled to the belt or chain, wherein each driven pulley is coupled to a ball screw which is mated with a corresponding ball nut, and wherein each ball screw and ball nut combination is coupled to the valve pin plate.

8. The injection molding apparatus of claim 1, wherein the nozzle comprises a plurality of nozzles, each nozzle including a corresponding valve pin, wherein each valve pin is connected to the valve pin plate.

9. The injection molding apparatus of claim 1, wherein the nozzle comprises a plurality of nozzles, the valve pin plate comprises a plurality of valve pin plates, the ball screw comprises a plurality of ball screws, the ball nut comprises a plurality of ball nuts, and the driven pulley comprises a plurality of driven pulleys;

wherein each nozzle includes a corresponding valve pin extending therethrough, each valve pin is connected to one of the plurality of valve pin plates, each valve pin plate is connected to one of the plurality of ball nuts, each ball nut mates with one of the plurality of ball screws, each ball screw is coupled to one of the plurality of driven pulleys to rotate with the driven pulley, and each driven pulley is coupled to the belt or chain.

10. The injection molding apparatus of claim 9, wherein the plurality of nozzle comprises thirty-two nozzles, the plurality of valve pin plates comprises four valve pin plates, the plurality of ball screws comprises four ball screws, the plurality of ball nuts comprises four ball nuts, and the plurality of driven pulleys comprises four driven pulleys;

wherein each nozzle includes a corresponding valve pin extending therethrough such that eight valve pins are connected to each of the four valve pin plates, each of the four valve pin plates is connected to one of the four ball nuts, each ball nut mates with one of the four ball screws, each ball screw is coupled to one of the four driven pulleys to rotate with the driven pulley, each driven pulley is coupled to the belt or chain.

11. An injection molding apparatus, comprising:
a motor;
a drive pulley coupled to the motor;
a belt or chain coupled to the drive pulley;
a driven pulley coupled to the belt or chain;
a back plate, wherein the driven pulley is coupled to the back plate and rotatable with respect to the back plate;
a mold plate;
a screw having a first portion coupled to the driven pulley and a second portion coupled to the mold plate in a rotatable manner, the screw being rotatable with the driven pulley;
a valve pin plate;
a nut connected to the valve pin plate and mated with the screw;
a valve pin coupled to the valve pin plate;
a manifold fixed with respect to the back plate; and
a nozzle connected to the manifold, the valve pin extending through the nozzle to control flow of molding material.

12. The injection molding apparatus of claim 11, wherein the valve pin plate includes a top plate, a bottom plate, and a bolting flange, wherein the bolting flange connects the nut to the top plate.

13. The injection molding apparatus of claim 11, further comprising a valve pin holder connected to the valve pin plate, the valve pin holder connecting the valve pin to the valve pin plate.

14. The injection molding apparatus of claim 13, wherein the valve pin holder includes a neck portion, a clip portion, and a main body portion disposed between the neck and clip portions, wherein a T-slot is provided in the clip portion to receive and hold a head of the valve pin.

15. The injection molding apparatus of claim 11, wherein there are at least two driven pulleys coupled to the belt or chain, wherein each driven pulley is coupled to a screw which is mated with a corresponding nut, and wherein each screw and nut combination is coupled to the valve pin plate.

16. The injection molding apparatus of claim 11, wherein the nozzle comprises a plurality of nozzles, each nozzle including a corresponding valve pin, wherein each valve pin is connected to the valve pin plate.

17. The injection molding apparatus of claim 11, wherein the nozzle comprises a plurality of nozzles, the valve pin plate comprises a plurality of valve pin plates, the screw comprises a plurality of screws, the nut comprises a plurality of nuts, and the driven pulley comprises a plurality of driven pulleys;

wherein each nozzle includes a corresponding valve pin extending therethrough, each valve pin is connected to one of the plurality of valve pin plates, each valve pin plate is connected to one of the plurality of nuts, each nut mates with one of the plurality of screws, each screw is coupled to one of the plurality of driven pulleys to rotate with the driven pulley, and each driven pulley is coupled to the belt or chain.

18. The injection molding apparatus of claim 17, wherein the plurality of nozzle comprises thirty-two nozzles, the plurality of valve pin plates comprises four valve pin plates, the plurality of ball screws comprises four ball screws, the plurality of ball nuts comprises four ball nuts, and the plurality of driven pulleys comprises four driven pulleys;

wherein each nozzle includes a corresponding valve pin extending therethrough such that eight valve pins are connected to each of the four valve pin plates, each of the four valve pin plates is connected to one of the four ball nuts, each ball nut mates with one of the four ball screws, each ball screw is coupled to one of the four driven pulleys to rotate with the driven pulley, each driven pulley is coupled to the belt or chain.

19. An injection molding apparatus, comprising:
a motor;
a drive pulley coupled to the motor;
a belt or chain coupled to the drive pulley;
a driven pulley coupled to the belt or chain;
a back plate, wherein the driven pulley is coupled to the back plate and rotatable with respect to the back plate;
a driven pulley coupled to the back plate and rotatable with respect to the back plate;
a nut connected to the driven pulley to rotate with the driven pulley;
a valve pin plate;
a screw connected to the valve pin plate and mated with the nut;
a valve pin connected to the valve pin plate;
a manifold fixed with respect to the back plate; and
a nozzle connected to the manifold, the valve pin extending through the nozzle to control flow of molding material.

* * * * *